(12) United States Patent
Cherubini et al.

(10) Patent No.: US 8,988,817 B1
(45) Date of Patent: Mar. 24, 2015

(54) TAPE STORAGE MEDIUM (71) Applicant: International Business Machines Corporation, Armonk, NY (US)

(72) Inventors: Giovanni Cherubini, Rueschlikon (CH); Simeon Furrer, Rueschlikon (CH); Jens Jelitto, Rueschlikon (CH); Mark A. Lantz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/490,155

(22) Filed: Sep. 18, 2014

(30) Foreign Application Priority Data

Sep. 30, 2013 (GB) .................................. 1317261.4

(51) Int. Cl.
*G11B 5/584* (2006.01)
*G11B 5/008* (2006.01)

(52) U.S. Cl.
CPC ............ *G11B 5/00826* (2013.01); *G11B 5/584* (2013.01)
USPC ..................... 360/77.12; 360/78.02

(58) Field of Classification Search
USPC .............. 360/55, 76, 319, 322, 77.12, 48, 49, 360/72.1, 72.3, 78.02, 77.01, 134, 77.15, 360/110, 60, 291
See application file for complete search history.

(56) References Cited

U.S. PATENT DOCUMENTS

| 4,551,777 | A | | 11/1985 | Saito et al. | |
|---|---|---|---|---|---|
| 5,946,156 | A | * | 8/1999 | Schwarz et al. | 360/75 |
| 6,031,673 | A | * | 2/2000 | Fasen et al. | 360/53 |
| 6,937,413 | B2 | | 8/2005 | Bui et al. | |
| 7,038,872 | B2 | * | 5/2006 | Yip et al. | 360/48 |
| 7,095,583 | B2 | * | 8/2006 | Johnson et al. | 360/77.12 |
| 7,466,510 | B2 | * | 12/2008 | Johnson et al. | 360/77.12 |
| 8,619,384 | B1 | * | 12/2013 | Bates et al. | 360/76 |
| 8,687,324 | B2 | * | 4/2014 | Biskeborn et al. | 360/319 |
| 8,760,795 | B2 | * | 6/2014 | Cherubini et al. | 360/77.12 |
| 2005/0099714 | A1 | | 5/2005 | Yip et al. | |
| 2006/0126207 | A1 | | 6/2006 | Johnson et al. | |
| 2006/0274446 | A1 | | 12/2006 | Johnson et al. | |
| 2014/0226235 | A1 | * | 8/2014 | Cherubini et al. | 360/48 |

FOREIGN PATENT DOCUMENTS

| WO | 0215174 A1 | 2/2002 |
|---|---|---|
| WO | 2011104050 A2 | 9/2011 |

OTHER PUBLICATIONS

IPO UK Search Report; Application No. GB1317261.4; Patents Act 1977: Search Report under Section 17(5); Date Mailed: Mar. 31, 2014; pp. 1-4.

* cited by examiner

*Primary Examiner* — Ali Neyzari (74) *Attorney, Agent, or Firm* — Cantor Colburn LLP (57) ABSTRACT

A tape storage medium comprises at least one data band and the data band comprises a set of data sub-bands adjacent to each other. Each data sub-band contains a set of data tracks along a longitudinal extension of the tape storage medium and adjacent to each other. Each data sub-band of the set comprises a pair of servo tracks for supporting to determine positional information. The set of data tracks of each data sub-band is arranged between the servo tracks of the pair. The servo tracks of the pair contain the same servo pattern.

15 Claims, 5 Drawing Sheets

TAPE STORAGE MEDIUM

FOREIGN PRIORITY

This application claims priority to Great Britain Patent Application No. 1317261.4, filed Sep. 30, 2013, and all the benefits accruing therefrom under 35 U.S.C. §119, the contents of which in its entirety are herein incorporated by reference.

BACKGROUND

The present invention relates to a tape storage medium and to methods for writing to a tape storage medium.

A conventional tape storage medium typically comprises servo information prerecorded in dedicated servo bands that extend next to data bands for storing data, which servo bands and data bands extend in a longitudinal direction along the tape medium. For example, according to the LTO (Linear Tape Open) Ultrium specification four data bands are straddled by five servo bands. For reading and/or writing data from /to a data band a tape head assembly is positioned to span the entire width of the data band and at least parts of the two servo bands adjacent to the data band. The tape head assembly comprises a set of data readers and writers, e.g., sixteen or thirty-two, arranged next to each other along a lateral extension of the tape head assembly orthogonal to the longitudinal extension of the tape storage medium when being inserted in a tape drive containing the tape head assembly. The tape head assembly further comprises at least two servo readers at the edges of the set of data readers and data writers, so that the data readers and data writers are located between the servo readers. The servo readers are provided for reading servo information from the two servo bands. The servo information in the servo bands typically allows for determining several essential servo parameters, e.g., a lateral position of the tape storage medium with respect to the tape head assembly, a tape velocity, and a longitudinal tape position.

For writing data to the data band the tape head assembly is set to a desired lateral position on the tape storage medium and data is written simultaneously by the data writers of the set while the tape storage medium is moved across the tape head assembly in a first direction, e.g., in a forward motion direction. When the tape head assembly has reached the end of the tape storage medium, the tape head assembly is set to a different lateral position, i.e., laterally offset to the previous position, the tape motion direction is reversed and data is continued to be written simultaneously by the data writers of the set while the tape storage medium is moved across the tape head assembly in the reverse motion direction. Hence, the data band is recorded in a serpentine fashion.

A data track is referred to as a longitudinal track within a data band written by a single data writer. In serpentine recording, a set of data tracks written at the same time is referred to as a wrap. In serpentine recording, a set of data tracks written by the same data writer within the data band is also referred to as a data sub-band. The number of data tracks contained in a data sub-band, which also represents the number of wraps in the data band, depends on a width of the data band, a width of the data writers and a resolution of lateral position information that is enabled by the servo patterns in the servo band. In order to enable writing in the serpentine fashion, the data writers are arranged offset from each other on the tape head assembly along its lateral extension. A distance between two adjacent data writers may be set to the number of wraps to be recorded in the data band times the width of a data track such that data tracks written in the same wrap are offset from each other for leaving a gap in between for writing data tracks in subsequent wraps into the gap.

The servo information prerecorded in the servo bands allows for identifying a lateral position of the tape storage medium with respect to the tape head assembly when being read by the dedicated servo readers. Based on the identified lateral position the tape head assembly may also be set to a new desired lateral position at the end of a wrap for writing a new wrap in a reverse motion direction of the tape storage medium. In addition, the prerecorded servo information allows for determining a lateral deviation of the tape storage medium from a desired lateral position during writing and/or reading data. For this purpose, a position error signal representing the lateral deviation may be translated into a control signal for an actuator for controlling a lateral position of the tape head assembly with respect to the tape storage medium.

In an alternate way of writing data to a tape storage medium, which is also referred to as adjacent track recording, the tape head assembly being a part of a tape head and containing a transducer array no longer spans the entire width of a data band as defined above but only spans a portion of the width of the data band. Again, the tape head assembly may contain a set of data readers and writers which are now arranged next to each other along a lateral extension of the tape head assembly orthogonal to the longitudinal extension of the tape storage medium when being inserted in a tape drive containing the tape head assembly. While in serpentine recording the data writers of the set are arranged laterally offset from each other the data writers are now preferably arranged close to each other without a significant gap in between such that data tracks written simultaneously by the data writers are arranged adjacent to each other in the data band. Given that no additional data tracks are to be recorded in between two adjacent data tracks there is no need for a significant gap in between. Hence, data written by adjacent data writers result in adjacent data tracks on the data band while in serpentine recording data tracks written by adjacent data writers in one pass result in data tracks gapped from each other. In the latter case, the gap is filled or respectively will be filled by data tracks written or to be written in different wraps.

In adjacent track recording the set of data tracks simultaneously written next to each other during the tape storage medium moving across the tape head assembly is also referred to as a data sub-band. The number of data sub-bands within a given width of the tape depends on the width of the tape head assembly. Once a data sub-band is written and the tape head assembly has reached the end of the tape storage medium, the tape head assembly is set to a new lateral position with respect to the tape storage medium for writing another data sub-band in a reverse tape motion direction. The offset of the new lateral position to the previous lateral position is at least the width of the tape head assembly to avoid that overwriting of the previously written data sub-band.

An advantage offered by adjacent track recording is given by the reduced width of the tape head assembly compared to the width of the tape head assembly in the serpentine recording. By having reduced the total span of the tape head assembly and making a channel pitch, i.e., a pitch between adjacent data readers and writers equal to the track pitch, environmental effects known as tape dimensional stability effects can be reduced. For example, the tape storage medium may laterally expand or contract dependent on variations in temperature and/or in humidity. Such expansion or contraction may more adversely impact the writing and reading of data the larger the tape head assembly span is.

SUMMARY

In one embodiment, a tape storage medium includes at least one data band, the data band comprising a set of data sub-bands adjacent to each other, each data sub-band containing a set of data tracks along a longitudinal extension of the tape storage medium and adjacent to each other, wherein: each data sub-band of the set comprises a pair of servo tracks for supporting to determine positional information, wherein the set of data tracks of each data sub-band is arranged between the servo tracks of the pair, and wherein the servo tracks of the pair contain at least one servo pattern; every N-th data sub-band of the set is referred to as reference data sub-band, with N≥2; the servo patterns in the servo tracks of the reference data sub-bands of the set are distinct from each other; and the servo tracks of the N−1 data sub-bands arranged between consecutive reference data sub-bands contain one or more servo patterns distinct from each other in the case of more than one servo pattern and distinct from each of the servo patterns in the servo tracks of any reference data sub-band of the set.

In another embodiment, a method for writing data to a tape storage medium includes writing data sub-bands in a data band of the tape storage medium, the data band arranged between two servo bands preformatted with servo information and each of which data sub-bands contains a set of adjacent data tracks extending along a longitudinal extension of a tape storage medium, the writing data sub-bands further including: writing first a data sub-band adjacent to one of the two servo bands including simultaneously writing the set of data tracks of the data sub-band by means of a set of data writers, simultaneously to writing the set of data tracks writing a pair of servo tracks framing the set of data tracks by means of servo writers, and simultaneously to writing the set of data tracks and the servo tracks reading servo information from the adjacent servo band by means of a servo reader; writing next a data sub-band adjacent to the previously written data sub-band including simultaneously writing the set of data tracks of the data sub-band by means of the set of data writers, simultaneously to writing the set of data tracks writing a pair of servo tracks framing the set of data tracks by means of the servo writers, and simultaneously to writing the set of data tracks and the servo tracks reading servo information from a servo track of the adjacent previously written data sub-band by means of the or another servo reader; and repeating the writing next for each additional data sub-band to be written.

In another embodiment, a method for writing data to a tape storage medium includes writing data sub-bands in a data band which data band of the tape storage medium is arranged between two servo bands preformatted with servo information and each of which data sub-bands contains a set of adjacent data tracks extending along a longitudinal extension of a tape storage medium, the writing data sub-bands further including: writing first a data sub-band adjacent to one of the two servo bands including simultaneously writing the set of data tracks of the data sub-band by means of a set of data writers, simultaneously to writing the set of data tracks writing a pair of servo tracks framing the set of data tracks by means of servo writers, and simultaneously to writing the set of data tracks and the servo tracks reading servo information from the adjacent one servo band by a servo reader; writing second a data sub-band adjacent to the other servo band, simultaneously writing the set of data tracks of the data sub-band by means of the set of data writers, simultaneously to writing the set of data tracks writing a pair of servo tracks framing the set of data tracks by means of the servo writers, and simultaneously to writing the set of data tracks and the servo tracks reading servo information from the adjacent other servo band by means of the or another servo reader; and writing next a data sub-band adjacent to the pre-previously written data sub-band including simultaneously writing the set of data tracks of the data sub-band by means of the set of data writers, simultaneously to writing the set of data tracks writing a pair of servo tracks framing the set of data tracks by means of the servo writers, and simultaneously to writing the set of data tracks and the servo tracks reading servo information from a servo track of the adjacent pre-previously written data sub-band by means of the or another servo reader; and repeating the writing next for each additional data sub-band to be written.

BRIEF DESCRIPTION OF THE SEVERAL VIEWS OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION

According to an embodiment of a first aspect of the present invention, a tape storage medium comprises at least one data band, the data band comprising a set of data sub-bands adjacent to each other. Each data sub-band contains a set of data tracks along a longitudinal extension of the tape storage medium and adjacent to each other. Each data sub-band of the set comprises a pair of servo tracks for supporting to determine positional information, wherein the set of data tracks of each data sub-band is arranged between the servo tracks of the pair, and wherein the servo tracks of the pair contain the same servo pattern. Every N-th data sub-band of the set is referred to as reference data sub-band. The servo patterns in the servo tracks of the reference data sub-bands of the set are distinct from each other, with N≥2. The servo tracks of the N−1 data sub-bands arranged between any two consecutive reference data sub-bands contain one or more servo patterns distinct from each other in the case of more than one servo pattern, and distinct from each of the servo patterns in the servo tracks of any reference data sub-band of the set.

In embodiments, the tape storage medium may comprise one or more of the following features: N>2, and the servo tracks of the N−1 data sub-bands arranged between any two consecutive reference data sub-bands contain two servo patterns distinct from each other and distinct from each of the servo patterns in the servo tracks of every N-th data sub-band of the set; the two different servo patterns alternate in the servo tracks on even and odd data sub-bands of the N−1 data sub-bands; the data band contains a number M of data sub-bands with M=P+(P−1)*(N−1), with P denoting the number of reference data sub-bands, and the number of different servo patterns contained in the set of data sub-bands is P+2; each servo pattern represents a waveform when being read, wherein the waveforms of different servo patterns are orthogonal to each other; each servo pattern contains a pseudo noise sequence of symbols, wherein the pseudo noise sequences of different servo patterns are different from each other; each servo pattern contains magnetic transitions at a defined frequency, wherein the frequencies of magnetic transitions of different servo patterns are different from each other; additional information is encoded in the servo patterns of one or more of the servo tracks which additional information is one or more of: Longitudinal position information, manufacturing information, a servo band identifier, a servo track subset identifier; additional information is encoded in the servo patterns of one or more of the servo tracks which additional information is encoded by phase modulation and/or amplitude modulation each data band is arranged in between two preformatted servo bands.

According to an embodiment of another aspect of the present invention, a method is provided for writing data to a tape storage medium. Data sub-bands in a data band of the tape storage medium are written which data band is arranged between two servo bands preformatted with servo information and each of which data sub-bands contains a set of adjacent data tracks extending along a longitudinal extension of a tape storage medium. First a data sub-band is written adjacent to one of the two servo bands by simultaneously writing the set of data tracks of this data sub-band by means of a set of data writers, simultaneously to writing the set of data tracks writing a pair of servo tracks framing the set of data tracks by means of servo writers, and simultaneously to writing the set of data tracks and the servo tracks reading servo information from the adjacent servo band by means of a servo reader. Next, a data sub-band is written adjacent to the previously written data sub-band including simultaneously writing the set of data tracks of this data sub-band by means of the set of data writers, simultaneously to writing the set of data tracks writing a pair of servo tracks framing the set of data tracks by means of the servo writers, and simultaneously to writing the set of data tracks and the servo tracks reading servo information from a servo track of the adjacent previously written data sub-band by means of the or another servo reader. The "next" step is repeated for each additional data sub-band to be written.

In an exemplary embodiment, between writing the first data sub-band and writing the next data sub-band, and between each repetition of writing next data sub-bands, the tape motion direction is reversed and a tape head assembly containing the set of data writers, the servo writers and the one or more servo readers is positioned to a new lateral position with respect to the tape storage medium which new lateral position is offset with respect to a previous lateral position by a width of a data sub-band.

According to an embodiment of another aspect of the present invention, data sub-bands are written in a data band which data band of the tape storage medium is arranged between two servo bands preformatted with servo information and each of which data sub-bands contains a set of adjacent data tracks extending along a longitudinal extension of a tape storage medium. First, a data sub-band is written adjacent to one of the two servo bands by simultaneously writing the set of data tracks of the data sub-band by means of a set of data writers, simultaneously to writing the set of data tracks writing a pair of servo tracks framing the set of data tracks by means of servo writers, and simultaneously to writing the set of data tracks and the servo tracks reading servo information from the adjacent one servo band by means of a servo reader. Second, a data sub-band is written adjacent to the other servo band by simultaneously writing the set of data tracks of the data sub-band by means of the set of data writers, simultaneously to writing the set of data tracks writing a pair of servo tracks framing the set of data tracks by means of the servo writers, and simultaneously to writing the set of data tracks and the servo tracks reading servo information from the adjacent other servo band by means of the or another servo reader. Next, a data sub-band is written adjacent to the pre-previously written by simultaneously writing the set of data tracks of the data sub-band by means of the set of data writers, simultaneously to writing the set of data tracks writing a pair of servo tracks framing the set of data tracks by means of the servo writers, and simultaneously to writing the set of data tracks and the servo tracks reading servo information from a servo track of the adjacent pre-previously written data sub-band by means of the or another servo reader. For each additional data sub-band to be written, the "next" operation is repeated.

In an exemplary embodiment, between the first and the second operation, between the second operation and the "next" operation, and between each repetition of the "next" operation the tape motion direction is reversed and a tape head assembly containing the set of data writers, the servo writers and the one or more servo readers is positioned to a new lateral position with respect to the tape storage medium.

According to an embodiment of another aspect of the present invention, a method is provided for writing data to a tape storage medium according to one of the previous embodiments comprising identifying a data sub-band to write data to by reading servo patterns of servo tracks of data sub-bands contained on the tape storage medium. A set of adjacent data tracks is simultaneously written to the identified data sub-band by means of a set of data writers. Simultaneously to writing the set of data tracks, servo information is read from the servo tracks of the identified data sub-band. Identifying the data sub-band to write data to includes: If the data sub-band to write to pertains to one of the reference data sub-bands, a tape head assembly containing the set of data readers is laterally moved across the data sub-bands and the servo patterns of the data sub-bands are read until the servo pattern specific for the data sub-band to write to is detected. If the data sub-band to write to does not pertain to one of the reference data sub-bands, one of the two reference data sub-bands closest to the data sub-band to write to is identified and a number n of servo tracks with periodically alternating servo patterns associated with the data sub-bands between the data sub-band to write to and the identified closest reference data sub-band is identified. A tape head assembly containing the set of data readers is laterally moved across the data sub-bands and the servo patterns of the data sub-bands are read until the servo pattern specific for the identified closest reference data sub-band is detected. The tape head assembly is further laterally moved until a number of n servo tracks with periodically alternating servo patterns have passed. For identification of the data sub-bands, one or more servo and/or one or more data readers may be utilized.

According to an embodiment of another aspect of the present invention, a tape storage system is provided comprising a tape storage medium according to any one of the preceding embodiments wherein each data track of a set has a width. A tape head assembly of the tape storage system comprises a set of data readers for simultaneously reading data from the data tracks of the set, wherein the width of each data reader of the set along a lateral extension of the tape head assembly exceeds the width of a data track wherein the lateral extension of the tape head assembly is orthogonal to a longitudinal extension of the tape storage medium when being arranged in a tape drive containing the tape head assembly spanning at least the set of data tracks during reading. The number of the data readers in the set corresponds to the number of the data tracks in the set. Centers of the data readers are laterally offset from each other in the tape head assembly by the width of a data track. The set of data readers is arranged between a pair of servo readers.

According to an embodiment of a further aspect of the present invention, a computer program product is provided comprising a computer readable medium having computer readable program code embodied therewith, the computer readable program code comprising computer readable program code configured to perform a method according to any of the previous embodiments.

Embodiments described in relation to the aspect of write head shall also be considered as embodiments disclosed in connection with any of the other categories such as the method.

A tape storage medium for storing data (also abbreviated as tape), and in particular a magnetic tape storage medium may be arranged in a cartridge which cartridge may be inserted into a tape drive for reading data from the tape storage medium and writing data to the storage tape medium. The tape storage medium has a longitudinal extension and a width orthogonal to its longitudinal extension. The tape is wound onto one or more reels which are driven by the tape drive in order to make the tape pass by data readers and writers of a tape head assembly for reading and/or writing data from and/or to the tape storage medium.

In connection with embodiments of the invention, a set of adjacent data tracks is written to the tape storage medium in one pass, i.e., simultaneously by means of a tape head assembly comprising a number of data writers that corresponds to the number of data tracks in the set. The set of tracks written in one pass is also denoted as data sub-band. Adjacent in this context means that the data tracks written at the same time are arranged next to each other and remain in this adjacent arrangement even after additional data sub-bands will have been written by the tape head assembly. The adjacent data tracks in a data sub-band do not show a gap in between. Any gap width is assumed to be smaller than a data track width. Preferably, assuming that the data writers are placed in a staggered fashion in the tape head assembly and assuming that a width of a data writer is larger than a pitch between adjacent data writers, each data track written by a data writer is partially overwritten by the data track written by the adjacent data writer, i.e., shingled writing is applied. In contrast, in serpentine recording data tracks written in one pass by data writers of a tape head assembly result in data tracks gapped from each other, which gap is going to be filled by data tracks written in different wraps. For example, in case the desired width of a data track is 2 μm and 30 data tracks are written in one pass in adjacent track recording, the width of the entire set of data tracks within a data sub-band written by the data writers in one pass may be as small as 2 μm×30. In contrast, in serpentine recording, the lateral distance between two data readers in the tape head assembly may e.g., be in the range of 40 to 80 μm for a 32 channel head or 160 μm for a 16 channel head in order to reserve enough space for other data tracks written in between in future passes of the tape head assembly.

In adjacent track recording, the number of data sub-bands within a given width of the tape depends on the width of the tape head assembly. Once a data sub-band is written and the tape head assembly has reached the end of the tape storage medium, the tape head assembly is set to a new lateral position with respect to the tape storage medium for writing another data sub-band in a reverse tape motion direction. The new lateral position of the tape head assembly with respect to its previous lateral position is at least the width of the set of tracks to avoid overwriting of the previously written data sub-band.

As a result of the foregoing, it is preferred that in a tape head assembly the data writers are arranged offset from each other in the lateral dimension by the data track width. It is also preferred that the width of a data writer is slightly larger than the data track width, e.g., in the range [1 . . . 1.2] times the data track width to allow shingled recording. Lateral in this context denotes the dimension orthogonal to the longitudinal extension of the tape storage medium when arranged underneath the tape head assembly for reading and/or writing data therefrom/thereto. In view of the close proximity between adjacent data writers, crosstalk may occur during data writing. Hence, it is preferred that adjacent data writers are arranged offset from each other in the longitudinal dimension of the tape head assembly for reducing crosstalk during writing. Such arrangement is also referred to as staggered arrangement.

A corresponding tape head assembly contains a set of data readers for reading from the adjacent recorded data tracks. Such tape head assembly no longer spans the entire width of a data band between two servo bands—if any—as in serpentine reading/recording, but only spans the portion of such width corresponding to a data sub-band. This is advantageous since a lateral expansion or contraction of the tape storage medium in response to environmental effects such as variations in temperature and/or humidity affects the reading and/or writing from/to the tape storage medium less than in serpentine reading/recording with a tape head assembly with a wider span.

However, given that the tape head assembly no longer spans the entire data band, the tape head assembly only rarely has access to servo information prerecorded in the servo bands while most of the times the tape head assembly does not cover any of the servo bands. Hence, a concept for controlling the lateral position of the tape head assembly is desired. For this purpose, each data sub-band of a set comprises a pair of servo tracks for supporting to determine positional information. The set of data tracks of each data sub-band is arranged between the servo tracks of the pair. The pair of servo tracks preferably contains the same servo pattern. This shall include, that the each servo track of the pair contains the same servo patterns together with other servo patterns that may be different in each of the servo tracks. However, in an exemplary embodiment, the servo patterns in the servo tracks of a pair are identical. In a different embodiment, the servo pattern in a first one of the servo tracks differs from the servo pattern in the second of the servo tracks.

Hence, the layout of the data sub-bands is adapted to adjacent track reading and recording. It is preferred that each data sub-band contains its own pair of servo tracks which results in servo tracks of adjacent data sub-bands being adjacent to each other. The servo patterns in the various servo tracks support positioning the tape head assembly on a desired data sub-band within a data band. The width of a servo track may correspond to the width of a data track. Preferably, the tape head assembly may include at least one additional servo reader for reading from each servo track. The dedicated servo tracks may provide additional information such as timing information and/or other information such as LPOS (Longitudinal Positioning Information), servo band ID, servo track ID, manufacturing information etc. Additional information may be encoded in the dedicated servo tracks by phase modulation and/or amplitude modulation.

According to other aspects of the present invention methods of writing data are presented, which can independently or jointly be applied while it is ensured that servo information is reliably extracted for a proper operation of a track- and/or skew-following and/or reel-to-reel servo mechanism. A first approach includes preformatted servo bands for initial global positioning. In one embodiment, the writing of data includes a self-writing of servo tracks in alignment with one of the servo bands first and subsequently aligned with the servo tracks of the previously written data sub-bands. Between the writing of one data sub-band adjacent to one of the servo bands and writing the next data sub-band, or between writing any two data sub-bands, in the same direction, the tape head assembly containing the set of data writers, the servo writers and the one or more servo readers is positioned to a new lateral position with respect to the tape storage medium which new lateral position is offset with respect to a previous lateral position by a width of a data sub-band. Hence, the adjacent data sub-bands in the data band are written in opposite directions.

In another embodiment, a data sub-band is written next to one of the servo bands first, and another data sub-band is written next to the other servo band second. Then, the tape head assembly jumps back in the vicinity of the first servo band and writes a further data sub-band next to the pre-previously written data sub-band, i.e., the data sub-band written first, and so on. Hence, the adjacent data sub-bands in a first half of the data band are all written in the same first direction, while the adjacent data sub-bands in a second half of the data band are all written in the same direction opposite to the first direction.

In a second approach preformatted servo tracks are provided in correspondence of the data sub-bands. In this approach, data can be written to a target data sub-band after the servo signals from the servo tracks are detected within the corresponding data band. In one embodiment, the complexity of a realization of a corresponding servo writer arrangement for writing the various servo tracks is reduced by writing explicit data sub-band information in servo tracks only for a subset of the data sub-bands, and specifically in reference sub-bands.

In an exemplary embodiment, a reading of servo information from the dedicated servo tracks of the data sub-bands is based on a correlation method. The servo reader for doing so preferably is dimensioned with a width exceeding the width of the servo track to read from, such that in its readback signal there is also a component of the servo pattern written to the servo track of the adjacent data sub-band. For extracting the subject information from the readback signal of the servo reader a correlation preferably is applied between the readback signal of the servo reader and known waveforms representing the different servo patterns used. As indicated above, in case a servo reader covering partly two adjacent servo tracks with different servo patterns, the associate readback signal at least contains the superposition of the waveforms from the two different servo patterns. An energy measure of the waveforms detected may allow for determining a lateral position of the tape head assembly with respect to the tape storage medium, i.e., a deviation from a centered position including a direction of the deviation. The lateral position and/or deviation may finally be used for controlling an operation of the tape storage system during writing and/or reading data to/from the tape storage medium, e.g., for repositioning the tape head assembly such that the data readers and/or data writers are repositioned on their respective data track centers, or for repositioning the tape head assembly at the end of the tape storage medium for reading and/or writing from/to another data sub-band in a reverse tape motion direction.

Given that the tape storage medium typically is a magnetic storage medium, servo patterns are represented by magnetic transitions along the data tracks. Such magnetic transitions represent a waveform in the readback signal of a servo reader. In this context it is emphasized, that the waveform shall encompass a representation of the subject signal in both, the time domain and the frequency domain. The waveform representing the reading of a servo pattern may in one embodiment result from a predefined pseudo noise sequence written to the servo track. Specifically, a pseudo noise sequence comprises a sequence of binary symbols and as such a defined bit pattern of a given length of binary symbols. In a different embodiment, a predefined waveform resulting from reading an underlying servo pattern may be characterized in the spectral domain by a defined frequency of magnetic transitions in the subject servo track. Specifically, a waveform with defined spectral components at given frequencies in the spectral domain is a periodic waveform in the time domain, and preferably a sinusoidal waveform in the time domain.

In case of different servo patterns used in adjacent servo tracks, it may be preferred that the corresponding waveforms in the readback signal may be orthogonal to each other. Orthogonality is fulfilled if a product of the spectrum or a correlation of the time function of the subject waveform with a waveform in an adjacent track is zero. Quasi-Orthogonality is fulfilled if a product of the spectrum or a correlation of the time function of the subject waveform with a waveform in an adjacent track is essentially zero. This means, that a cross-correlation between any two different waveforms preferably is zero or close to zero either in the time domain or in the spectral domain for all different waveforms applied. The waveforms preferably used in the different servo tracks, and hence their underlying magnetic transition schemes defining the different servo patterns, are preferably orthogonal or quasi-orthogonal. This feature may be used in particular when servo patterns are written to adjacent servo tracks. A servo reader of the tape head assembly may then, for example, extract servo information by a cross-correlation of the known waveforms stemming from the different servo patterns in the adjacent servo tracks with the readback signal of the servo reader, which includes the superposition of signals from the different servo patterns.

In case different bit patterns representing pseudo noise sequences are used as servo patterns, the waveforms resulting from reading the different pseudo noise sequences are preferably orthogonal in the time domain. The readback signals of the servo readers then are preferably analyzed in the time domain. The different pseudo-noise sequences used in one embodiment are preferably characterized by good cross-correlation properties. Such sequences in one example may be Gold sequences. Alternatively, the pseudo noise sequences used may originally be derived from a single pseudo noise sequence with good auto-correlation properties. Such pseudo noise sequence may include Barker codes, complementary sequences or maximal length sequences. In this embodiment, the servo patterns of two adjacent servo tracks are written with the same pseudo noise sequence, however, with a phase offset and/or opposite polarities. An advantage of this scheme is that a detector may include only a single sequence correlator. In case different defined frequencies of magnetic transitions are used as servo patterns, the orthogonal waveforms resulting from reading the different frequencies of magnetic transitions are preferably analyzed in the spectral domain, e.g., using a Discrete Fourier Transform.

For each of the above described variants, the underlying servo patterns may preferably belong to a class of energy based servo (EBS) patterns. If such servo patterns of adjacent servo tracks are read by a single servo reader covering multiple of the servo tracks while reading, the readback signal from the servo reader provides different energies of the different waveforms present in the readback signal subject to the coverage of the different servo tracks. By means of estimating and/or evaluating the energies of the different waveforms in the readback signal and specifically by building ratios between the various energies, additional servo information may be acquired. Any such servo patterns used may thus aim at fast and accurate acquisition of lateral position information.

Figure 1:
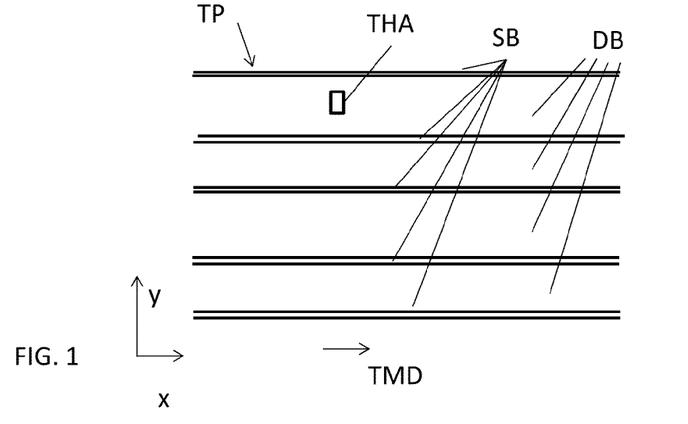
FIG. 1 is a top view on a schematic tape storage system according to an embodiment of the present invention.

FIG. 1 schematically illustrates a tape storage system in a top view on a section of a tape TP that passes a tape head assembly THA. The tape TP has a longitudinal extension in x direction and a lateral extension in y direction. The longitudinal extension in x direction coincides with a tape motion direction TMD, assuming there is no tape skew. Servo bands SB and data bands DB extend along the longitudinal extension of the tape TP. Each data band DB is arranged in between two servo bands SB. Each data band DB contains multiple sets of adjacent data tracks not shown in detail wherein preferably each set of adjacent data tracks representing a data sub-band is written and/or read simultaneously in case the tape head assembly THA comprises a number of data writers and data readers respectively which number preferably corresponds to the number of data tracks in each set. Each servo band SB contains servo patterns arranged along the longitudinal extension of the tape TP.

Figure 2:
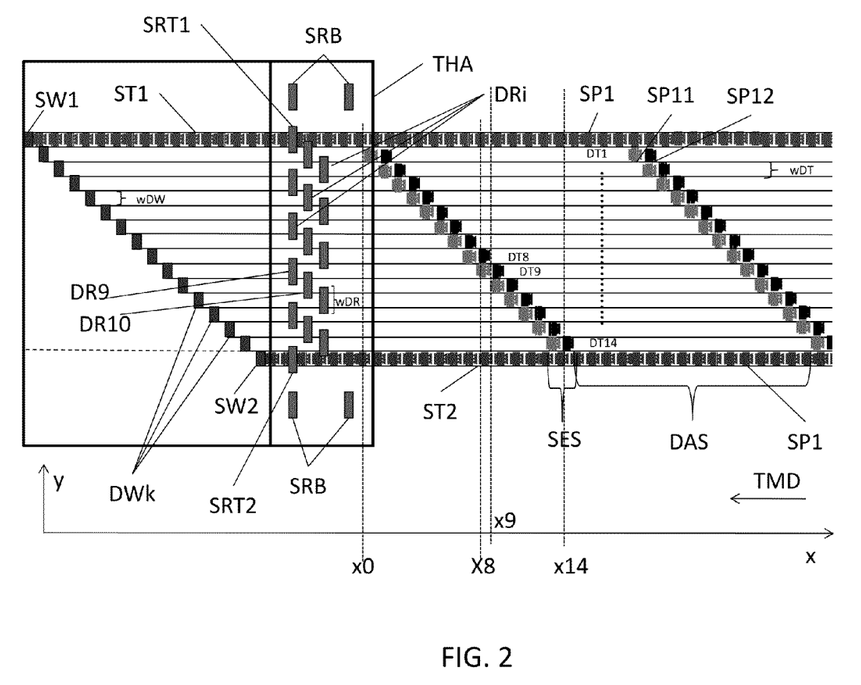
FIG. 2 is a top view on a schematic tape storage medium according to an embodiment of the present invention.

FIG. 2 illustrates the top view of a data sub-band, e.g., the data sub-band of FIG. 1 the tape head assembly THA currently covers. The data sub-band as shown contains a set of fourteen adjacent data tracks DT1 . . . DT14. The set of data tracks DTj, j=[1 . . . 14] is arranged in between two servo tracks ST1 and ST2 of the data sub-band. The tape head assembly THA contains fourteen data readers DRi, i=[1 . . . 14] for simultaneous reading from the fourteen data tracks DTj. Each data track DTj has a width wDT in y-direction. Each data reader DRi of the tape head assembly THA has a width wDR that exceeds the width wDT of each data track DTj such that each data reader DRi spans more than one data track DTj while reading and as such reads components stemming from at least two adjacent data tracks DTj. Given that each data reader DRi spans at least two adjacent data tracks DTj, multi-channel detection is enabled. The data readers DRi are arranged in three rows, each row claiming a different longitudinal position x. In the present embodiment, the data readers DRi of a row read from every third data track DTj in the set. Preferably, the data readers DRi are embodied as magneto resistive (MR) elements that are sandwiched on separate layers of the tape head assembly THA manufactured in thin film technology.

The tape head assembly THA further contains fourteen data writers DWk, k=[1 . . . 14], each with a width wDW corresponding to the width wDT of a data track DTj. The data writers DWk are arranged offset from each other in the longitudinal direction x, i.e., each data writer DWk is arranged at a different longitudinal position x on the tape head assembly THA. Given that the data writers DWk are designated to write adjacent data tracks DTj that are arranged close to each other, such staggered arrangement leads to a reduced crosstalk during writing. The data readers DRi and the data writers DWk are mechanically coupled in the tape head assembly THA.

In the embodiment of FIG. 2, servo information in form of a repeated servo pattern SP1 is encoded into the pair of servo tracks ST1, ST2 framing the set of data tacks DTj. Preferably, the servo pattern SP1 is represented by a pseudo noise (PN) sequence. LPOS and sub-band identification information may be encoded in the PN sequence using, e.g., polarity modulation. In an exemplary embodiment, the phases of the servo patterns SP1 in the pair of servo tracks ST1, ST2 are aligned with each other. The servo tracks ST1, ST2 may either be written by corresponding servo writers SW1 and SW2 of the tape head assembly THA which may also be understood as data writers DWk in view of the same physical properties, and may be written in a self-servo writing procedure. Alternatively, the servo patterns SP1 in the servo tracks ST1, ST2 may be preformatted during tape manufacturing.

The servo tracks ST1, ST2 are read by corresponding servo readers SRT1 and SRT2 each having a width corresponding to the width wDR of a data reader DRi and as such exceeding the width wDT of a data track DTj. Hence, each of the servo readers SRT1 and SRT2 not only scans the assigned servo tracks ST1 and ST2 but may also cover a part of an adjacent servo track of an adjacent data sub-band. In case the servo pattern SP1 is represented by a pseudo noise sequence, it is preferred that the servo patterns in the adjacent servo tracks of the adjacent data sub-bands are also PN sequences. However, it is generally preferred that adjacent data sub-bands contain different servo patterns, i.e., different PN sequences in their servo tracks. Different in this context is understood as resulting in different waveforms, and preferably result in waveforms orthogonal to each other. A servo reader SRT1 or SRT2 may then provide e.g., two superimposed waveforms in its readback signal. By means of a suitable detection logic, the component waveforms may be separated and subject to the energies of the respective component waveforms a lateral position of the tape head assembly THA may be derived. Hence a correlation detection concept preferably is applied with respect to the readback signals from the servo readers SRT1, SRT2, too. Moreover, the servo information from the servo pattern SP1 can be used as a continuous source of side information to characterize a signal fading that neighboring channel signals undergo with respect to a main channel signal component, as the tape head assembly lateral position fluctuations due to the finite track-following precision translate into fluctuations of the neighboring channel signal gains.

Optionally, as is shown in FIG. 2, each data track DTj of the set may additionally contain servo information injected in the data tracks of the set, e.g., in servo sections SES alternating with data sections DAS. In each servo section SES, a first servo pattern SP11 is followed by a second servo pattern SP12. The servo sections SES are periodically repeated in each data track DTj of the set, with a period much greater than a length of the servo sections SES, so that the servo sections SES appear as servo bursts interleaved with data. The servo information can be used to provide feedback to a track- and/or skew-following system, as well as to provide information related to a longitudinal position (LPOS) of the tape and/or velocity estimates for a transport system for the tape. The servo sections SES in each data track DTj are arranged offset in longitudinal direction x from the servo sections SES in the adjacent data tracks DTj, i.e., the servo sections SES of adjacent data tracks DTj start at different longitudinal positions x. However, the servo sections SES of adjacent data tracks DTj preferably overlap. The servo patterns SP11 and SP12 may be written during the normal data writing procedure as PN signal bursts interleaved with data. Note that the servo information can be obtained in general by resorting to orthogonal signals, such as sinusoidal waveforms of different frequencies, instead of PN sequences. A data reader DRi of the set, e.g., the data reader DR9 may at a certain point in time t8 arrive at the longitudinal position x8 and read on its way from x8 to x9 simultaneously the two servo patterns SP1 and SP2 resulting in superimposed waveforms in the readback signal. By means of correlation operations the energy of each waveform can be determined and a ratio between the waveform energies may represent a lateral position along the y axis of the data reader DR9 and of the entire tape head assembly THA with respect to the tape. At position x9 corresponding to time t9 the data reader DR9 no longer is in a position to provide information as to the lateral position of the tape head assembly THA due to the lack of a servo pattern in the data track DT8. Instead, the data reader DR10 can now provide this information given that starting at x9 the data reader DR10 shows the components of the two waveforms in its readback signal, the components now stemming from the second servo pattern SP2 in data track DT9 and the first servo pattern SP1 in data track DT10. In the same way, the data readers DR1 to DR14 may subsequently read servo information while passing the tape between x0 and x14. Hence, at each point in time during traveling this section of the tape servo information can be gathered, however, each time from a different data reader DRi. All the waveforms resulting from the servo patterns SP1, SP11, SP12 when being read are quasi-orthogonal to each other, i.e., are characterized by good cross-correlation properties, so that these waveforms can be distinguished when being present in a readback signal of a data reader DRi or a servo reader SRT1, SRT2.

The tape head assembly THA of FIG. 2 also shows four additional servo readers SRB. These additional servo readers SRB may, for example, read from prewritten servo bands such as shown in FIG. 1 that allow global positioning of a tape head containing the tape head assembly THA. This additional servo information may allow positioning the tape head assembly THA on a first data sub-band DSB1 adjacent to a servo band SB for writing this first data sub-band DSB1 or reading therefrom.

Figure 3:
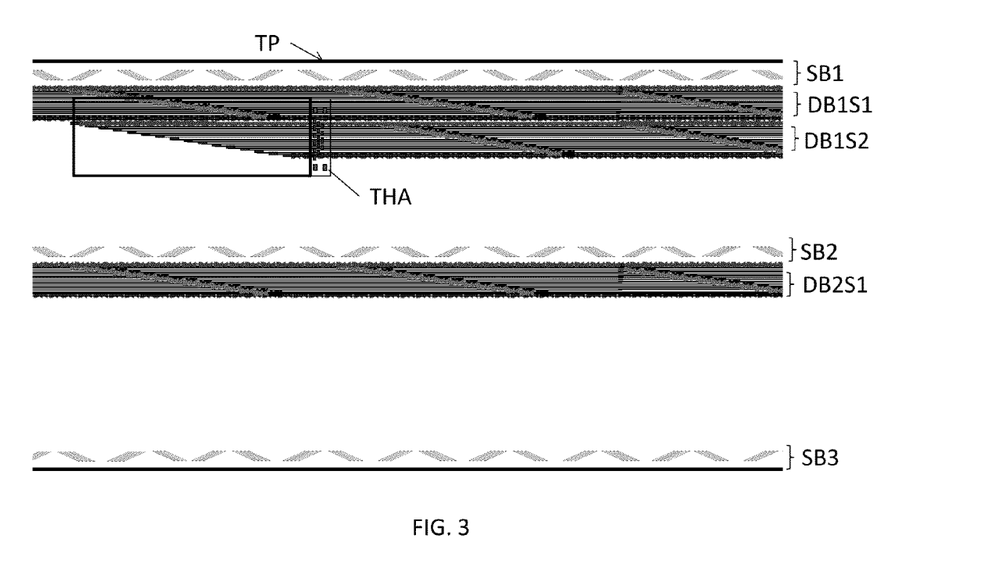
FIG. 3 is a top view on a schematic tape storage medium according to an embodiment of the present invention.

FIG. 3 illustrates a schematic view of a tape storage system according to an embodiment of the present invention. A tape TP of the tape storage system is presently read by a tape head assembly THA as shown in FIG. 2. The layout of the tape TP contains e.g., three servo bands SB1, SB2, SB3 with data bands arranged in between. Each data band contains a set of data sub-bands DSBm. Only two of these data sub-bands DSB1 and DSB2 of the first data band and a single data sub-band DSB1 of the second data band are explicitly shown for illustration purposes. The tape head assembly THA presently writes to and/or reads from the second data sub-band DSB2.

The servo bands SB1, SB2, SB3 contain preformatted servo information, which in the present embodiment includes preformatted timing based servo (TBS) patterns containing bursts of inclined stripes which allow for determining a lateral position of the tape head assembly THA when the dedicated servo reader SRB evaluates a timing of pulses stemming from the stripes of the TBS information, as well as longitudinal position information which may be encoded in a phase shift of individual stripes of the TBS pattern. The factory-preformatted servo bands SB may instead or additionally of the described TBS bursts contain high-density patterns such as pseudo noise sequences. Hence, the servo bands SB provide global positioning capabilities for the tape head assembly THA provided that the tape head assembly THA at least partly covers one of the servo bands SB.

However, as can be seen in FIG. 3, owed to the adjacent track recording concept and the reduced width of the tape head assembly THA the tape head assembly THA does not cover a servo band SB at all when writing or reading from a majority of the data sub-bands DSBm. For this purpose, it is preferred that each data sub-band DSBm has a pair of servo tracks ST1 and ST2 when the set of data tracks DTi is arranged in between the pair of servo tracks ST1 and ST2. Hence, there is servo information provided in each data sub-band.

Figure 4:
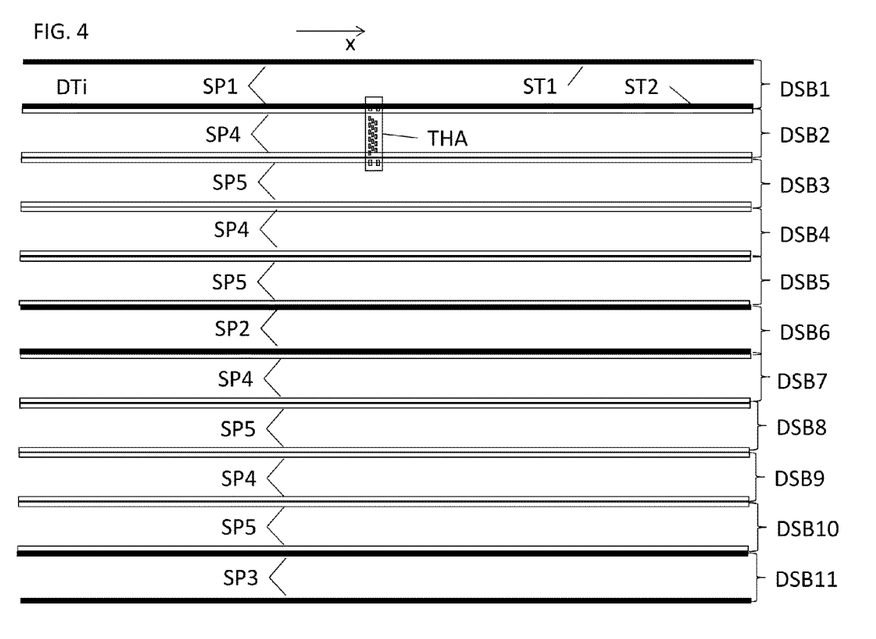
FIG. 4 is a top view on a schematic tape storage medium according to an embodiment of the present invention.

The tape storage system of FIG. 4 shows a section of a sample data band containing eleven data sub-bands DSB1 . . . DSB11. The tape head assembly THA presently reads from/writes to the data sub-band DSB2. Each data sub-band DSBm contains a first servo track ST1 and a second servo track ST2 at the outer edges of the set of data tracks DTj. Every fifth data sub-band in the present example, i.e., N=5, is a reference data sub-band and contains a unique servo pattern that is different from each of the servo patterns used in any of the other reference data sub-bands. Presently, the data sub-bands DSB1, DSB6 and DSB11 contain different servo patterns SP1, SP2 and SP3, the waveforms of which servo patterns SP1, SP2 and SP3 are orthogonal with respect to each other. The N−1=4 data sub-bands in between each reference data sub-band contain servo patterns SP4 and SP5 in an alternating manner, i.e., for the N−1=4 servo sub-bands DSB2 to DSB5 and DSB7 to DSB10, each even data sub-band contains the servo pattern SP4 in its two servo tracks ST1 and ST2, and each odd data sub-band contains the servo pattern SP5 in its two servo tracks ST1 and ST2.

In an exemplary embodiment, the data sub-bands DSBm are written in single passes, i.e., the adjacent data tracks DTi of each data sub-band DSBm are written simultaneously. And preferably, the various data sub-bands DSBm are written in a serpentine fashion. Preferably, a pair of servo bands frames the present data band. The first data sub-band DSB1 may be written first next to the upper servo band in a forward tape motion direction, and the data sub-band DSB11 may be written second and next to the lower servo band in a reverse tape motion direction, and so forth, until the data band is filled with written data sub-bands DSBm. The servo information from the servo bands may be read by the servo readers SBR, see FIG. 2. Hence, when writing the data sub-bands DSB1 and DSB11 in the series of data sub-bands, the servo information is directly obtained from the dedicated servo bands adjacent to these data sub-bands DSB1 and DSB11. When writing the successive data sub-bands DSB2-DSB10, servo information may be read from the servo information self-written to the servo tracks of the previously written adjacent data sub-bands. E.g., when writing the data sub-band DSB2 servo information is read from the second servo track ST2 of the first data sub-band DSB1, e.g., the servo reader SRT1, see FIG. 2. To avoid the accumulation of lateral and longitudinal position errors in the location of sequentially written data sub-bands over a large number of data sub-bands, various trade-offs can be considered between the number of servo bands, which would impact storage efficiency, and the number of additional servo readers in an adjacent tape head assembly, which would impact system implementation complexity.

In another embodiment, the servo tracks ST1 and ST2 of each data sub-band DSBm as well as the servo information in the servo bands may be prewritten at the tape manufacturer. However, preformatting separate servo tracks ST1, ST2 for each data sub-band DSBm with explicit/unique data sub-band information might be prohibitively complex and costly because of the sheer number of data sub-bands possibly present on a half-inch tape. Assuming 32 channels per data sub-band and a track pitch of 400 nm, this would result in about one thousand parallel data sub-bands and therefore a complex servo format head with one thousand independently controllable write transducers to preformat the tape in a single pass. The solution proposed in the embodiment of FIG. 4 reduces the complexity of a servo writer by writing different servo patterns only in a subset of data sub-bands, which data sub-bands are also referred to as "reference" data sub-bands, which reference data sub-bands are arranged from each other at an equidistance, i.e., every Nth data sub-band is a reference data sub-band, with N≥2. For the N−1 data sub-bands between consecutive reference data sub-bands, it is preferred that all even data sub-bands therein contain the same servo pattern and all odd data sub-bands contain another different servo pattern. The servo patterns in the N−1 data sub-bands are different from the servo patterns in the reference data sub-bands.

In the illustration of FIG. 4, the data sub-bands DSB1, DSB6 and DSB11 are reference data sub-bands, whereas the data sub-bands in between contain the non-unique servo patterns SP4 or SP5 in an alternating manner. Assuming that the required servo information is provided by quasi-orthogonal PN sequences, by resorting to the proposed approach the number of separately driven coils in a servo writer can be drastically reduced by a factor of e.g., thirty in the above example, and to additional two PN sequences for the "even" and "odd" data sub-bands in between. Note that in the example of FIG. 4 there would be N−1=4 data sub-bands arranged between two "reference" data sub-bands, i.e., N=5.

When it comes to writing a tape storage medium for the first time, two approaches may be envisaged. In a first one, only servo bands are preformatted on the tape storage medium. According to the flowchart of FIG. 5, in block S1 a data sub-band adjacent to one of the two servo bands is written. This includes writing the corresponding set of data tracks of this data sub-band simultaneously by means of a set data writers and writing simultaneously therewith the corresponding pair of servo tracks framing the set of data tracks by means of servo writers. While writing the data tracks and the servo tracks, servo information is read from the adjacent servo band by means of a servo reader, which can be a servo reader dedicated to reading from the servo band only, or which can be a servo reader dedicated to reading from servo tracks of data sub-bands.

Figure 5:
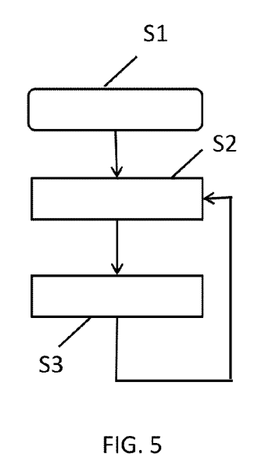
FIG. 5 is a flowchart representing a method for writing to a tape storage medium according to an embodiment of the present invention.

At the end of block S1, the tape motion direction is reversed and the tape head assembly is laterally offset.

In block S2, a next data sub-band is written, which data sub-band is selected to be the data sub-bands adjacent to the previously written first data sub-band. In this operation, for defining and holding the lateral position of the tape head assembly, servo information is read from the servo track of the adjacent and previously written data sub-band by means of the or another servo reader. While doing so, the set of data tracks of this next data sub-band is written by means of the set of data writers. The corresponding pair of servo tracks of this data sub-band is written by means of the servo writers. In block S3, the tape motion direction is reversed and the tape head assembly is laterally repositioned in order to write another data sub-band, preferably offset from the previous lateral position by the width of a data sub-band. This procedure is repeated until all of the data sub-bands fitting in between the servo bands are written, which is schematically illustrated by the loop in FIG. 5. Hence, the data band is filled by data sub-bands step by step starting from one servo band towards the other servo band. Adjacent data sub-bands are written in opposite directions on the tape.

Figure 6:
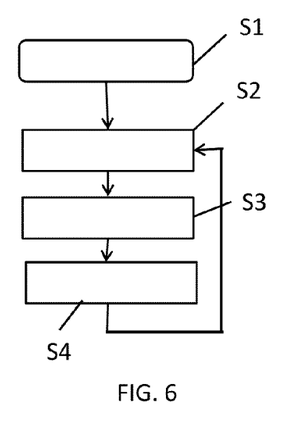
FIG. 6 is a flowchart representing a method for writing to a tape storage medium according to an embodiment of the present invention.

In an alternative, according to the flowchart of FIG. 6, in block S1 a data sub-band adjacent to one of the two servo bands is written. This includes writing the corresponding set of data tracks of this data sub-band simultaneously by means of a set data writers and writing simultaneously therewith the corresponding pair of servo tracks framing the set of data tracks by means of servo writers. While writing the data tracks and the servo tracks, servo information is read from the adjacent one servo band by means of a servo reader, which can be a servo reader dedicated to reading from the servo band only, or which can be a servo reader dedicated to reading from servo tracks of data sub-bands. At the end of block S1, the tape motion direction is reversed and the tape head assembly is laterally offset, so that the tape head assembly is positioned adjacent to the other servo band.

Then, in block S2 a data sub-band adjacent to the other servo band is written in the reverse direction, using servo information read from the other servo band. After writing this data sub-band in block S2, in block S3 the tape motion direction is reversed again and the tape head assembly is laterally repositioned next to the pre-previously written data sub-band, i.e., the data sub-band next to the one servo band. In block S4, this data sub-band is written in the same direction of tape motion as the first data sub-band written in block S1. In this operation, for defining and holding the lateral position of the tape head assembly, servo information is read from the servo track of the adjacent and pre-previously written data sub-band by means of the or another servo reader. While doing so, the set of data tracks of this next data sub-band is written by means of the set of data writers. The corresponding pair of servo tracks of this data sub-band is written by means of the servo writers. This procedure is repeated until all of the data sub-bands fitting in between the servo bands are written, which is schematically illustrated by the loop in FIG. 6. This means that in a following block S3, the tape motion direction is reversed again and the tape head assembly is laterally repositioned next to the pre-previously written data sub-band, i.e., the data sub-band next to the other servo band written second in block S2 in order to write a fourth data sub-band in the same direction of tape motion as the second written data sub-band.

In a second approach, servo bands and the pair of servo tracks of each data sub-band are preformatted on the tape storage medium, such as in FIG. 4. A request to write data to a target data sub-band of the tape storage medium is issued in block S10 of the flowchart of FIG. 7. In block S11, it is verified if the target data sub-band to write to pertains to one of the reference data sub-bands. If this is the case (Y), the tape head assembly is moved laterally across the data band and will detect the servo pattern specific for the reference data sub-band that coincides with the target data sub-band to write to in block S12. Once detected, the tape head assembly is positioned over the target data sub-band, and data is written simultaneously to the set of adjacent data tracks of the target data sub-band by means of a set of data writers, while at the same time the servo information contained in the servo tracks of the target data sub-band is read in block S13 for maintaining the data writers on track.

Figure 7:
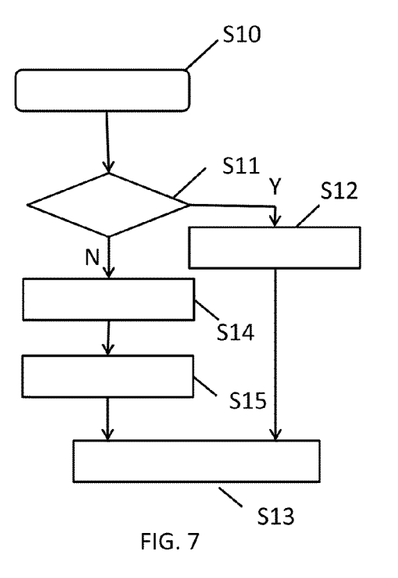
FIG. 7 is a flowchart representing a method for writing to a tape storage medium according to an embodiment of the present invention.

If it is determined in block S11 that the target data sub-band to write to does not pertain to one of the reference data sub-bands (N), one of the two closest reference data sub-bands is determined and a number n of data sub-bands is identified between the target data sub-band and the identified closest reference data sub-band in block S14. In block S15, the tape head assembly is laterally moved across the data band and the servo patterns of the identified closest reference data sub-band will be detected. In block S15, the tape head assembly is continued to be moved laterally until a total of n alternating servo patterns is detected. In response thereto, the tape head assembly is positioned over the target data sub-band and data is written simultaneously to the set of adjacent data tracks of the target data sub-band by means of a set of data writers, while at the same time the servo information contained in the servo tracks of the target data sub-band is read in block S13 for maintaining the data writers on track.

Writing data to a tape storage medium may be accomplished by locating a "reference" or target data sub-band and partially or completely replacing the preformatted data sub-band information in the servo tracks of the data target data sub-band and possibly in the data tracks thereof with data and servo information by means of adjacent track recording. Hence, the servo tracks may be overwritten each time the subject data sub-band is written. In a different embodiment, preformatted servo tracks are not overwritten when writing data to the corresponding data sub-band.

Figure 8:
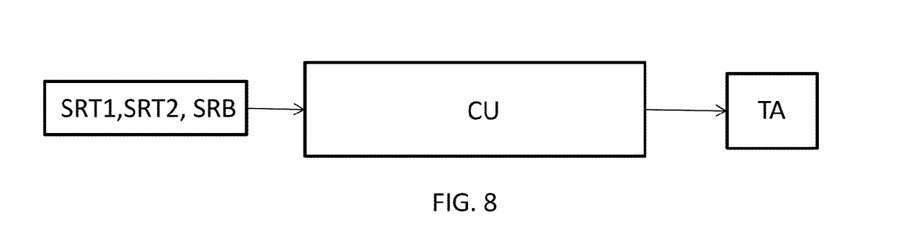
FIG. 8 is a block diagram of selected items of a tape storage system according to an embodiment of the present invention.

FIG. 8 illustrates a block diagram of a tape drive of a tape storage system according to an embodiment of the present invention, e.g., for a tape storage system according to FIG. 2. The servo readers SRT1, SRT2 and SRB provide their readback signals to a control unit CU. In the control unit, servo patterns are identified in the readback signals. From evaluating the servo patterns and comparing the received servo patterns to the servo patterns of a target data sub-band to write data to, a control signal is determined for repositioning the tape head assembly to a target data sub-band. In response to the control signal a tape head actuator TA laterally repositions the tape head assembly which comprises the servo readers and data writers.

An embodiment of the present invention further has potential to overcome the limitation that "write-append" only is currently available to write information on tape. A "write-in-place" may be enabled by adjacent track recording in conjunction with the ubiquitous presence of servo information in the form of preformatted servo tracks. This would allow an accurate alignment of the tape head assembly over any segment of tape, including those segments where information had been previously written. Enabling "write-in-place" to tape would drastically reduce the need for tape reclamation, where in certain intervals valid data from fragmented cartridges are moved to other tapes and the original tape cartridge will be reformatted as an empty cartridge.

It will be understood by those skilled in the art that many modifications and permutations may be made without departing from the scope of the present invention.

As will be appreciated by one skilled in the art, aspects of the present invention may be embodied as methods for writing to a tape storage medium, or a computer program product, a tape storage medium and a tape storage system. Accordingly, aspects of the present invention, in particular in form of the controller/control unit, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the method, may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A tape storage medium, comprising:
   at least one data band, the data band comprising a set of data sub-bands adjacent to each other, each data sub-band containing a set of data tracks along a longitudinal extension of the tape storage medium and adjacent to each other, wherein:
   each data sub-band of the set comprises a pair of servo tracks for supporting to determine positional information, wherein the set of data tracks of each data sub-band is arranged between the servo tracks of the pair, and wherein the servo tracks of the pair contain at least one servo pattern;
   every N-th data sub-band of the set is referred to as reference data sub-band, with N≥2;
   the servo patterns in the servo tracks of the reference data sub-bands of the set are distinct from each other; and
   the servo tracks of the N−1 data sub-bands arranged between consecutive reference data sub-bands contain one or more servo patterns distinct from each other in the case of more than one servo pattern and distinct from each of the servo patterns in the servo tracks of any reference data sub-band of the set.

2. The tape storage medium according to claim 1, wherein N>2, and wherein the servo tracks of the N−1 data sub-bands arranged between consecutive reference data sub-bands contain two servo patterns distinct from each other and distinct from each of the servo patterns in the servo tracks of any reference data sub-band of the set, and wherein the two different servo patterns alternate in the servo tracks on even and odd data sub-bands of the N−1 data sub-bands.

3. The tape storage medium according to claim 2, wherein the data band contains a number M of data sub-bands with:

$$M=P+(P-1)*(N-1)$$

with P denoting the number of reference data sub-bands in the set, and wherein the number of different servo patterns contained in the set of data sub-bands is P+2.

4. The tape storage medium according to claim 1, wherein each servo pattern represents a waveform when being read, and wherein the waveforms of different servo patterns are orthogonal to each other.

5. The tape storage medium according to claim 1, wherein each servo pattern contains a pseudo noise sequence of symbols, and wherein the pseudo noise sequences of different servo patterns are different from each other.

6. The tape storage medium according to claim 1, wherein each servo pattern contains magnetic transitions at a defined frequency, and wherein the frequencies of magnetic transitions of different servo patterns are different from each other.

7. The tape storage medium according to claim 1, wherein additional information is encoded in the servo patterns of one or more of the servo tracks, which additional information is one or more of:
   longitudinal position information;
   manufacturing information:
   a servo band identifier; and
   a servo track subset identifier.

8. The tape storage medium according to claim 1, wherein each data band is arranged in between two preformatted servo bands.

9. A method for writing data to a tape storage medium, the method comprising:
   writing data sub-bands in a data band of the tape storage medium, the data band arranged between two servo bands preformatted with servo information and each of which data sub-bands contains a set of adjacent data tracks extending along a longitudinal extension of a tape storage medium, the writing data sub-bands further comprising:
   writing first a data sub-band adjacent to one of the two servo bands including simultaneously writing the set of data tracks of the data sub-band by means of a set of data writers, simultaneously to writing the set of data tracks writing a pair of servo tracks framing the set of data tracks by means of servo writers, and simultaneously to writing the set of data tracks and the servo tracks reading servo information from the adjacent servo band by means of a servo reader;
   writing next a data sub-band adjacent to the previously written data sub-band including simultaneously writing the set of data tracks of the data sub-band by means of the set of data writers, simultaneously to writing the set of data tracks writing a pair of servo tracks framing the set of data tracks by means of the servo writers, and simultaneously to writing the set of data tracks and the servo tracks reading servo information from a servo track of the adjacent previously written data sub-band by means of the or another servo reader; and
   repeating the writing next for each additional data sub-band to be written.

10. The method according to claim 9, wherein between the writing first and the writing next, and between each repetition of the writing next, the tape motion direction is reversed and a tape head assembly containing the set of data writers, the servo writers and the one or more servo readers is positioned to a new lateral position with respect to the tape storage medium which new lateral position is offset with respect to a previous lateral position by a width of a data sub-band.

11. The method according to claim 9, wherein a section of an already written data track is identified to be overwritten, and wherein the data is written to the identified section of this data track.

12. A method for writing data to a tape storage medium, the method comprising:
   writing data sub-bands in a data band which data band of the tape storage medium is arranged between two servo bands preformatted with servo information and each of which data sub-bands contains a set of adjacent data tracks extending along a longitudinal extension of a tape storage medium, the writing data sub-bands further comprising:
   writing first a data sub-band adjacent to one of the two servo bands including simultaneously writing the set of data tracks of the data sub-band by means of a set of data writers, simultaneously to writing the set of data tracks writing a pair of servo tracks framing the set of data tracks by means of servo writers, and simultaneously to writing the set of data tracks and the servo tracks reading servo information from the adjacent one servo band by a servo reader;
   writing second a data sub-band adjacent to the other servo band, simultaneously writing the set of data tracks of the data sub-band by means of the set of data writers, simultaneously to writing the set of data tracks writing a pair of servo tracks framing the set of data tracks by means of the servo writers, and simultaneously to writing the set of data tracks and the servo tracks reading servo information from the adjacent other servo band by means of the or another servo reader; and writing next a data sub-band adjacent to the pre-previously written data sub-band including simultaneously writing the set of data tracks of the data sub-band by means of the set of data writers, simultaneously to writing the set of data tracks writing a pair of servo tracks framing the set of data tracks by means of the servo writers, and simultaneously to writing the set of data tracks and the servo tracks reading servo information from a servo track of the adjacent pre-previously written data sub-band by means of the or another servo reader; and repeating the writing next for each additional data sub-band to be written.

13. The method according to claim 12, wherein between the writing first and the writing second, between the writing second and the writing next, and between each repetition of the writing next, the tape motion direction is reversed and a tape head assembly containing the set of data writers, the servo writers and the one or more servo readers is positioned to a new lateral position with respect to the tape storage medium.

14. The method according to claim 12, further comprising:

identifying a data sub-band to write data to by reading servo patterns of servo tracks of data sub-bands contained on the tape storage medium;

simultaneously writing to a set of adjacent data tracks to the identified data sub-band by means of a set of data writers; and simultaneously to writing the set of data tracks reading servo information from the servo tracks of the identified data sub-band;

wherein identifying the data sub-band to write data to includes:

in the event the data sub-band to write to pertains to one of the reference data sub-bands, laterally moving a tape head assembly containing the set of data readers across the data sub-bands and reading the servo patterns of the data sub-bands until the servo pattern specific for the data sub-band to write to is detected;

in the event the data sub-band to write to does not pertain to one of the reference data sub-bands, identifying one of the two reference data sub-bands closest to the data sub-band to write to and identifying a number n of alternating data sub-bands between the data sub-band to write to and the identified closest data sub-band, laterally moving a tape head assembly containing the set of data readers across the data sub-bands and reading the servo patterns of the data sub-bands until the servo pattern specific for the identified closest reference data sub-band is detected, and laterally moving the tape head assembly until a total of n alternating servo patterns is detected.

15. A tape storage system comprising:

a tape storage medium according to claim 1, wherein each data track of a set has a width, and comprising a tape head assembly, the tape head assembly comprising a set of data readers for simultaneously reading data from the data tracks of the set, wherein:

the width of each data reader of the set along a lateral extension of the tape head assembly exceeds the width of a data track wherein the lateral extension of the tape head assembly is orthogonal to a longitudinal extension of the tape storage medium when being arranged in a tape drive containing the tape head assembly spanning at least the set of data tracks during reading;

the number of the data readers in the set corresponds to the number of the data tracks in the set;

centers of the data readers are laterally offset from each other in the tape head assembly by the width of a data track; and the set of data readers is arranged between a pair of servo readers.

* * * * *